United States Patent [19] [11] 4,176,788
Holman [45] Dec. 4, 1979

[54] GEOTHERMAL HOME CONSTRUCTION

[76] Inventor: William P. Holman, P.O. Box 12, Ord, Nebr. 68862

[21] Appl. No.: 895,803

[22] Filed: Apr. 12, 1978

[51] Int. Cl.² .................................... F24D 15/00
[52] U.S. Cl. .................................... 237/81; 98/32; 98/33 A; 165/DIG. 2
[58] Field of Search .................. 98/29, 31, 32, 33 A; 237/46, 49, 81; 165/45, DIG. 2; 126/116 B

[56] References Cited

U.S. PATENT DOCUMENTS

| | | | |
|---|---|---|---|
| 1,749,343 | 3/1930 | Hersh | 98/32 |
| 1,814,979 | 7/1931 | Taylor | 98/31 |
| 1,887,938 | 11/1932 | Lewis | 237/49 |
| 2,127,095 | 8/1938 | Strong | 98/33 A |
| 2,127,095 | 8/1938 | Strong | 98/31 |
| 3,247,895 | 4/1966 | Phillips, Jr. | 98/31 |
| 3,415,024 | 12/1968 | Kotlarz | 98/31 |
| 3,516,347 | 6/1970 | May | 98/31 |
| 3,905,548 | 9/1975 | Brodie | 98/31 |
| 4,016,858 | 4/1977 | Scogin | 126/116 B |

OTHER PUBLICATIONS

Solar Energy—Part II, *The Continent* by Field, p. 87.

Primary Examiner—Henry C. Yuen
Attorney, Agent, or Firm—LeBlanc & Shur

[57] ABSTRACT

A method for constructing structures to minimize the amount of fuel necessary to heat the structure during winter months as disclosed. The structure of this invention maximizes the heat obtainable from the earth at depths substantially below the frostline by providing a basement having a relatively thin floor of conducting or noninsulating material and walls with a maximum of reasonable insulation both in the basement level and in the living-level first floor of the structure. Grids are provided adjacent walls and below windows and doors at the first floor level whereby cold air within the house will drop to the basement. The external walls are of standard construction with maximum insulation to protect against heat loss from within the structure. The basement floor adjacent the walls may be insulated if desired. The structure consists of one or more floors over an excavated basement, the basement being at a depth sufficiently below the frostline so that the temperature of the earth or the geothermal heat will be relatively constant. In addition the walls are preferably insulated and the ceiling over the first floor contains insulation also.

10 Claims, 5 Drawing Figures

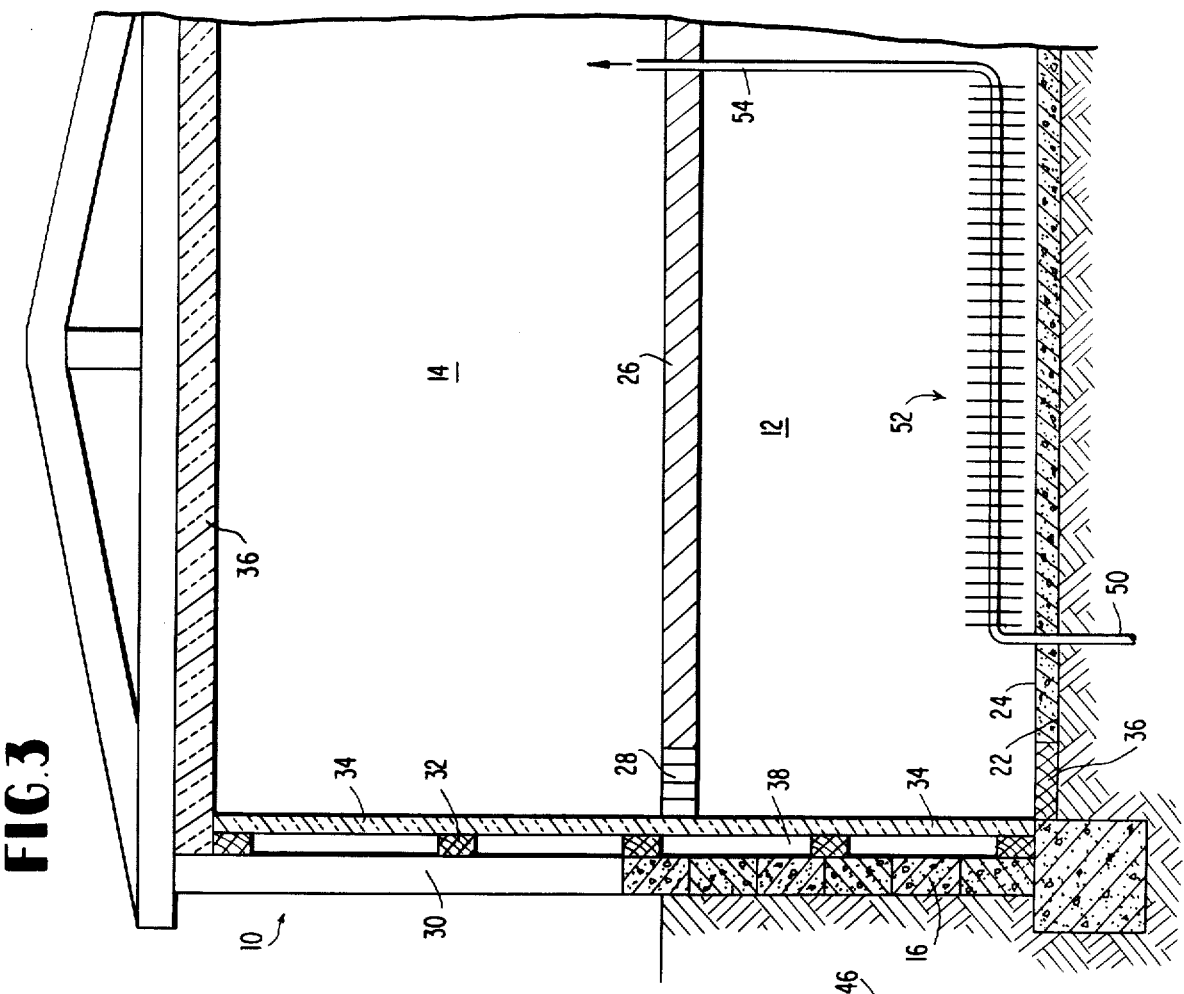
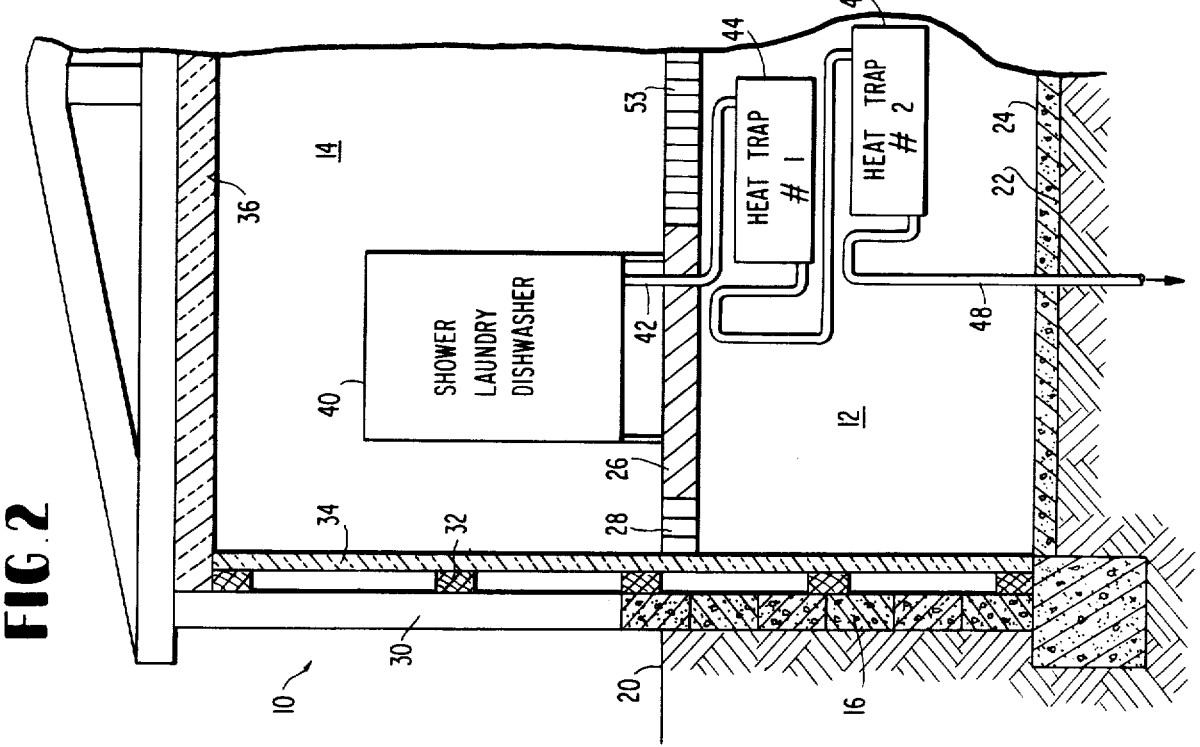

GEOTHERMAL HOME CONSTRUCTION

For thousands of years, since prehistoric times, man took refuge in caves to utilize the geothermal heat of the earth. At a sufficient depth, the interior temperature of the cave would remain at approximately 50° F. even during bitter cold winter weather.

In contrast, the average home today which has a full basement has a floor sufficiently below the ground level to be maintained at about 50° F. However, because of a lack of insulation, as will be subsequently explained, the ambient temperature within an unfinished basement may be substantially below the floor temperature.

The instant invention is directed to maximizing the warming effect of geothermal heat within a living structure whereby a base ambient temperature may be maintained within the structure at or near the temperature of the basement floor even though the exterior temperature may be as low as 20° below zero. The geothermal heat of the earth is then utilized as a heat sink because it has been established that the temperature at a substantial depth of, for example, seven feet, will vary from a median temperature of only about ±5 to 10 degrees from the hottest day of the year to the coldest. Furthermore, even this variation lags the change in surface temperature by at least about a month. Therefore, although the coldest surface temperature may be realized in the latter part of January, the coldest temperature at a depth of 7-10 feet may not be realized until as late as April, when the surface has already begun to experience the spring thaw and warming.

Whereas other sources of energy such as solar heaters, and windmill or wind chargers for storage batteries provide energy without cost, these means require large capital investments and are subject to atmospheric changes. Solar heaters, obviously, will not function on a cloudy day, and wind chargers or windmills cannot provide power in the absence of wind. In contrast, geothermal heat is a constant that requires no machinery to utilize. In addition, geothermal heat is most efficient when the home is subjected to the lowest exterior temperatures, at night. When no outside doors are opened, heat loss from within the structure is at a minimum. Therefore, the efficiency is maximized during the periods of lowest temperature. The solar heated home, in contrast, must rely at night, on an energy storage means for heat during normally the coldest part of a twenty-four hour day. Wind powered homes similiarly require storage means because the wind normally diminishes at night.

This invention comprehends the use of a supplemental heating source then and maximum use of geothermal heat to minimize dependence on the supplemental heating system. The size of a supplemental heating system will depend on the amount of insulation in the home and the outside temperatures to be contended with. It has been discovered that by providing maximum reasonable insulation on walls and ceilings, together with minimum insulation on the basement floor and grids to allow circulation of cold air downwardly from the living area to the basement floor will maximize utilization of geothermal heat. In other words, the atmosphere within the basement is placed in a heat exchange relationship with the earth beneath the basement floor covering and the structure itself is fully insulated to minimize heat loss therefrom.

Conventional uninsulated basement walls coupled with the normal loose fitting windows therein present a major source of heat loss in homes. A basement 30 feet by 30 feet and 7½ feet deep will present an uninsulated wall surface equal to the floor area. Therefore in conventional homes heat exchange through the basement floor is more than offset by heat exchange through the walls which are exposed to much lower external temperatures.

In addition, this invention includes the recovery of heat from hot water used within the structure before it is disposed of, and in addition, supplementing the heat transfer capability of the basement area by utilizing a circulating system for municipal water which also enters the structure at a temperature at or near the basement floor temperature of about 50° F.

Therefore, this invention relates to a method for constructing a heat efficient structure whereby only a minimum of fuel is necessary during winter months in order to maintain the interior living area of the structure at a temperature of about 68° F. The invention comprises the development of heat transfer between the interior of the structure and the earth at depth sufficiently below the frostline to provide a heat sink in a temperature range of about 50° F. It is well known that at a depth of five or more feet, the temperature of the earth is a relative constant, 50°-55° F. or 60° F. summer and winter. Accordingly, caves, fruit cellars and the like are usable during winter months without danger of freezing.

It has been discovered, however, that a conventional basement may be adapted to utilize geothermal heat, and thereby decrease the amount of supplemental heat necessary from costly energy sources such as natural gas, electricity, or fuel oil. It has been discovered that an ordinary depth basement may be maintained at a temperature of about 50° F. whereby convection currents from the living area over the basement may be established so that the supplemental heat required will only be that necessary to raise the temperature of the first floor living area from 50° to 68° F. during winter months when the outside temperature may be as low as −20° F.

In order to establish said convection currents it is necessary to fully insulate the walls of the basement and first floor of the structure and the ceiling over the first floor living area. It is then necessary to provide a basement floor only thinly covered with, for example, concrete so that heat transfer will be effective thereacross. If desired, the floor may even be bare earth. Also, the basement floor should not have insulating materials such as rugs or tiles thereon because such materials would obviously inhibit heat transfer.

In order to facilitate the convection currents between the living area on the first floor and the basement, a plurality of grids are provided in the first floor separating the basement and the living area. The grids are preferably disposed beneath sources of cold air such as windows and exterior doors so that the air entering the structure immediately circulates to the basement where it is warmed to the ambient 50° F. temperature of the floor. Supplemental heat is then provided preferably by hot air registers or baseboard electric heaters disposed in the first floor living area. If desired, heat sinks may be utilized to recapture some heat from hot water used within the structure. For example, hot water utilized in showers or in the kitchen may be circulated to a reservoir in the basement where it is retained while heat is transferred therefrom to the ambient atmosphere. When the reservoir cools to, for example 50° F. water therein may be discarded through conventional source systems. This invention then contemplates retention of water from dishwashers, showers, and sinks in a retention reservoir situated in the basement. The reservoir will function automatically to dump cool water from the bottom thereof as hot water enters the top.

The external walls of the structure may be of conventional construction. However, it is preferred that the basement walls be constructed of light-weight concrete blocks without windows. In view of the heavy heat loss associated with concrete walls above the surface line of the earth, and also in connection with basement windows, this invention contemplates a basement structure, as noted above, of light-weight concrete blocks, and an absence of windows or window wells in the basement. Of course, wood ducts, well insulated, may be used for ventilation. The upper story or first floor of the house may be constructed from conventional building materials, either wood or brick, or both, with preferably insulated windowglass on the windows. Furring strips could be placed horizontally rather than vertically to help minimize the downward circulation of air through the walls. The conventional walls of the structure of this invention then support maximum reasonable insulation materials such as fiberglass or the like which may be disposed between conventional vertical supports (studs). Wallboard or the like then completes the interior surface of the walls. The ceiling preferably is of conventional construction but with maximum reasonable insulation therein to thereby insulate fully the interior of the structure except for the basement floor which allows heat transfer between the interior and the earth therebelow. While the basement floor may be excavated to any depth desired, a constant temperature is normally found below about 5 feet and therefore the usual 7½ foot standard depth basement will be adequate.

In order to direct cold outside air to the basement floor, entry areas or vestibules are provided at external doors to the structure of this invention. A grid is located in the floor of the vestibule so that when the external door is opened, cold air entering the structure will drop to the basement. In addition, a vertical chute is provided to direct the cold air against the basement floor whereupon it becomes heated and circulates upwardly.

It it is desired to utilize picture windows in for example a living room, preferably on the south wall of the structure, grids are provided in the floor immediately adjacent the window, and a metal sheet provided to direct air from the lower portion of said picture window downwardly through the grid. Preferably, the metal sheet is painted black on the side facing the window to absorb heat in the winter. This type of metallic shield extend from about the middle of the window down to the floor.

Accordingly, it is an object of this invention to provide a method of constructing a home wherein a savings of theoretically up to 78% in both heat capacity and operation may be secured.

It is another object to supplement the interior heating requirements by facilitating heat transfer in a home between the interior living space and the earth below the basement floor.

It is another object to provide a living structure having a basement with all walls and ceiling fully insulated whereby convection currents are established between the living area and the basement to effect heat transfer between said area and the earth beneath the basement.

It is another object to provide a structure having a full basement, insulated walls, and an insulated ceiling with grids in the floors whereby the living area air on the first floor is in communication with the basement air so that convection currents are established therebetween to maximize utilization of the capacity to transfer heat from the earth beneath the basement floor to the interior of the structure.

It is still a further object to provide an insulated structure having a noninsulated basement floor and grids in the floor separating the first floor and the basement which grids are situated below windows, external doors, and the like so that cold air entering the structure drops to the basement floor for heat transfer across the basement floor with the earth disposed therebelow.

These and other objects will become readily apparent with reference to the drawings and following description wherein:

FIG. 2 is a fragmentary cross-sectional view of an embodiment of this invention;

FIG. 3 is a fragmentary cross-sectional view of an additional embodiment of this invention;

Figure 1:
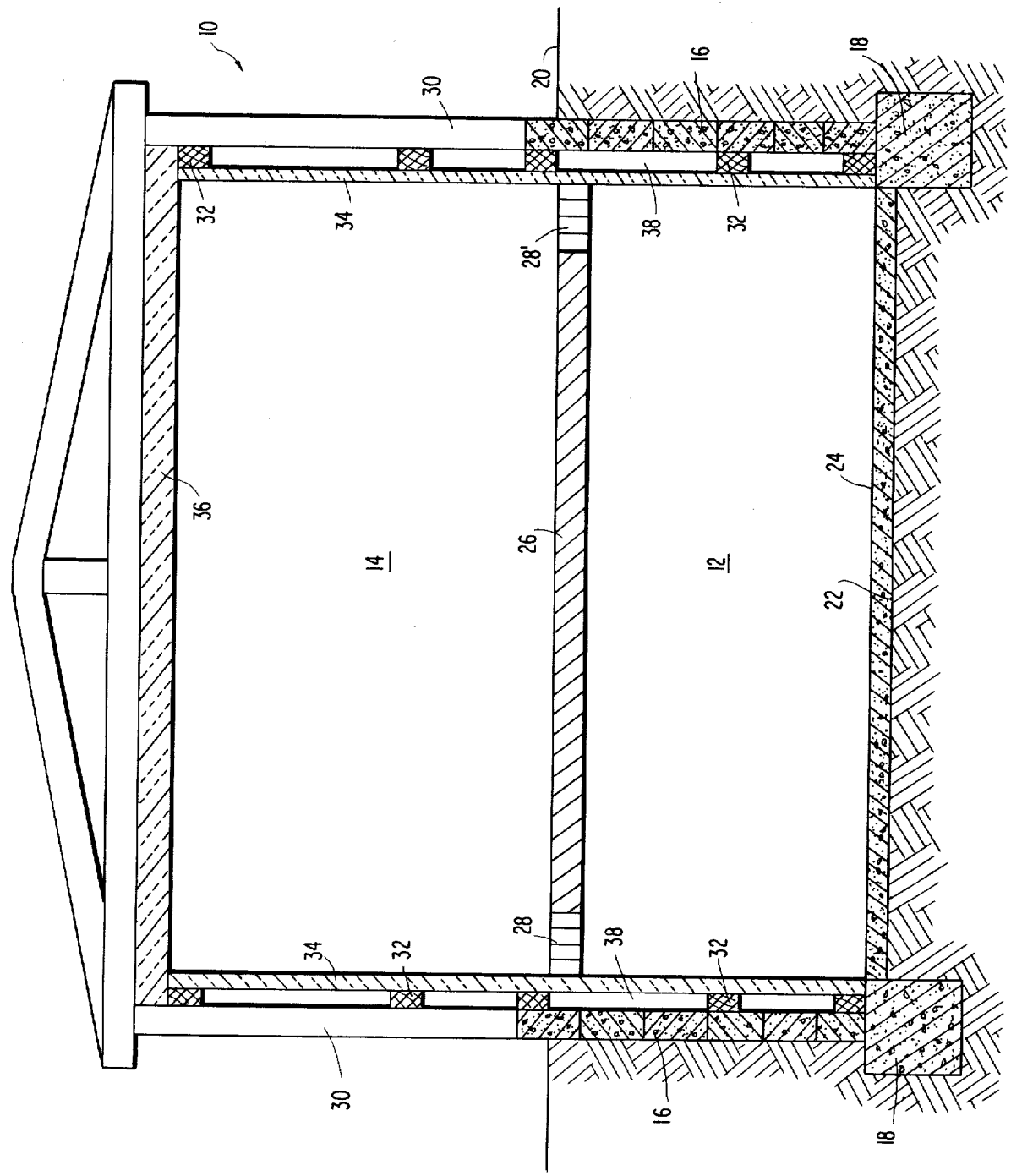
FIG. 1 is a cross-sectional view of the structure of this invention.

With attention to FIG. 1, the structure of this invention 10 comprises a basement area 12 and a first floor living area 14. The walls of the basement area are formed of preferably, conventional light-weight concrete blocks 16 with concrete footings 18. The basement area 12 is preferably excavated to about 7 feet below the surface 20. Earth at this level has been found to be maintained at a temperature of about 50° F. without regard for the temperature at surface 20. In other words, the temperature at level 22 will be about 50° F. regardless of the temperature at level 20.

For example, depending upon the locality, the frostline or the depth at which moisture in the ground freezes will vary from two or more feet due to the insulating characteristics of earth. At a level substantially below the frostline, such as 6–8 feet, the temperature of the earth will remain essentially constant during summer and winter. This invention is directed to a method for constructing a structure whereby the constant temperature of the earth may be utilized as a heat sink for maintaining a basement temperature of 50° F. which is then supplemented with auxiliary heat on the first floor level.

In view of the fact that it is an essential feature of this invention that heat transfer from the surface 22 to the air in the basement area 12 should be facilitated, the basement floor may consist of only a thin layer, for example concrete 24. In the alternative, the basement floor may consist of packed clay, bare earth, or any other relatively noninsulating material. However, it is essential to this invention that the basement floor be unobstructed by rugs, tile or other floor converings which would serve as insulators. Furthermore, storage boxes should be placed on tables or shelves and any basement partitions should have openings near the floor so that the entire floor of the basement can be placed in a heat-conducting relationship with the ambient atmosphere.

The living area 14 is separated from the basement area 12 by a conventional floor 26 constructed in the normal manner with transverse beams (not shown). The floor construction shown at 26 is intended to be conventional in design with the exception of grids 28 and 28' disposed at preselected areas. Grids 28 and 28' then allow communication between the living area 14 and the basement area 12 whereby convection currents may be established circulating cold air from area 14 downwardly into area 12 for heat exchange with surface 24. For example, grid 28 may be a vestibule or entry grid disposed adjacent the front door (not shown). Grid 28' would be disposed adjacent the back door (not shown) so that cold air entering would circulate to the basement 12 to be warmed. Cold air grids 28 also may be located beneath windows or other cold air areas.

The exterior walls 30 of the above ground portion of structure 10 are of conventional construction of brick or wood, for example. The walls, however, have maximum insulation which may be, for example, from four to six inches. Preferably, horizontal furring strips 32 extend along the walls 30 and the concrete blocks or bricks 16. These furring strips then support insulation 34 extending vertically from footings 18 to the upper portion of living area 14. This insulation is of conventional design.

As would be obvious to those skilled in the art, conventional vertical studs (not shown) may be used to support insulation 34, and wallboard or the like may be laid over the interior surface to complete construction of the walls. The living area 14 also has insulation 36 extending between walls 30 so that the living area 14 is sealed by insulation. Windows in the living area would be provided, but are not shown herein. Windows should be of conventional design with either double or triple pane glass. Similarly, grids (not shown) are disposed below these sources of cold air also.

Accordingly, the structure 10 is essentially thoroughly insulated on all sides and in the ceiling thereof so that heat exchange with the structure is by convection currents between the living area 14 and the basement floor 24 and through the basement floor to the earth at 22. Any interior living space (not shown) wherein windows could be opened, such as bedrooms during the night, should also be insulated with weatherstripping provided at the doors thereof, and walls should have the same insulation as exterior walls. In such instance, the grids 28 disposed within such a room would obviously be closed before windows were opened.

It is contemplated that the structure 10 would be served by an auxiliary heating source (not shown) which conventionally could be hot air, baseboard electric heaters, or the like disposed along the floor 26 and within living area 14. Of course, hot water or hot air furnaces could be disposed in the basement and radiators or ducts provided on the first floor. In view of the fact that without auxiliary heating, the interior of the structure would be maintained at or near the temperature of the basement floor 24, the heat necessary to maintain the living area at a confortable temperature during the winter months should be that equal to producing an increase in temperature from 50° F. to 68° F. While it is contemplated that rugs or the like would be disposed on floor 26, it is not contemplated that the basement floor 24 would be covered with any insulating material. In fact, if desired, the basement floor may be insulated itself from side walls and footings 18 by, for example, a wooden border piece 36. See FIG. 3. Insulating pieces 36, however, are optional and could be used to minimize heat transfer by contact with the footings 18.

With reference to FIG. 2, in order to make maximum utilization of the heat energy generated within the structure 10, this invention also contemplates a heat recovery system for retaining heated water in the basement area 12. When hot water from a hot water heater, (not shown) is utilized for example in a shower, laundry, or dishwasher, schematically shown at 40, the waste water normally would be at a temperature of 100° to 170° F., far higher than the basement ambient temperature in area 12. Accordingly, water from a hot water appliance could be routed by a conduit 42 to a heat trap 44. The hot water would be retained in the heat trap 44 until water at a higher temperature entered the trap. The cooler water would then be forced out of trap 44. The hot water within the trap would warm the air in the basement and would increase the basement temperature somewhat at the level of the heat trap. In view of the fact that the average four-person family uses 120 gallons of hot water a day, it is contemplated that a substantial amount of heat may be retained within the structure by holding the used hot water in heat trap 44.

As an additional embodiment, a second heat trap 46 could be provided for use as follows. If waste water is collected in heat trap 44 until it is partially cooled, it may be transferred to a second heat trap 46 by hotter water from applicance 40. When the water in heat trap 46 had reached ambient temperature, it would no longer need to be retained. However, to warm the basement air, it is important that the heat trap tanks be located so that they generally are in colder air than their own temperature. When the temperature of the water within the tank reaches ambient atmospheric temperature, it could be expelled through a conventional sewer drain 48.

In the alternative, as will be obvious to those skilled in the art, a single heat trap (not shown) could be utilized which would dump partially cooled water retained therein into drain 48 whenever appliances 40 expelled hotter water thereinto.

Heat traps 44 and 46 are of conventional design and are merely storage tanks intended to be utilized to warm the ambient air within basement area 12. They are located away from cold air grids so that the heat therein may rise into the living area through, for example a centrally located grid 53.

With reference to FIG. 3, it should be recognized that municipal water in a water line 50 utilized within the structure 10 enters the structure at a temperature of about 50° F. Accordingly, the water line 50 could extend along the basement floor 24 through a finned heat exchanger 52 before entering the living area through line 54 for use in kitchens and bathrooms. The heat exchanger 52 would then supplement the geothermal heat exchange between ambient air in the basement 12 and the basement floor 24.

Figure 4:
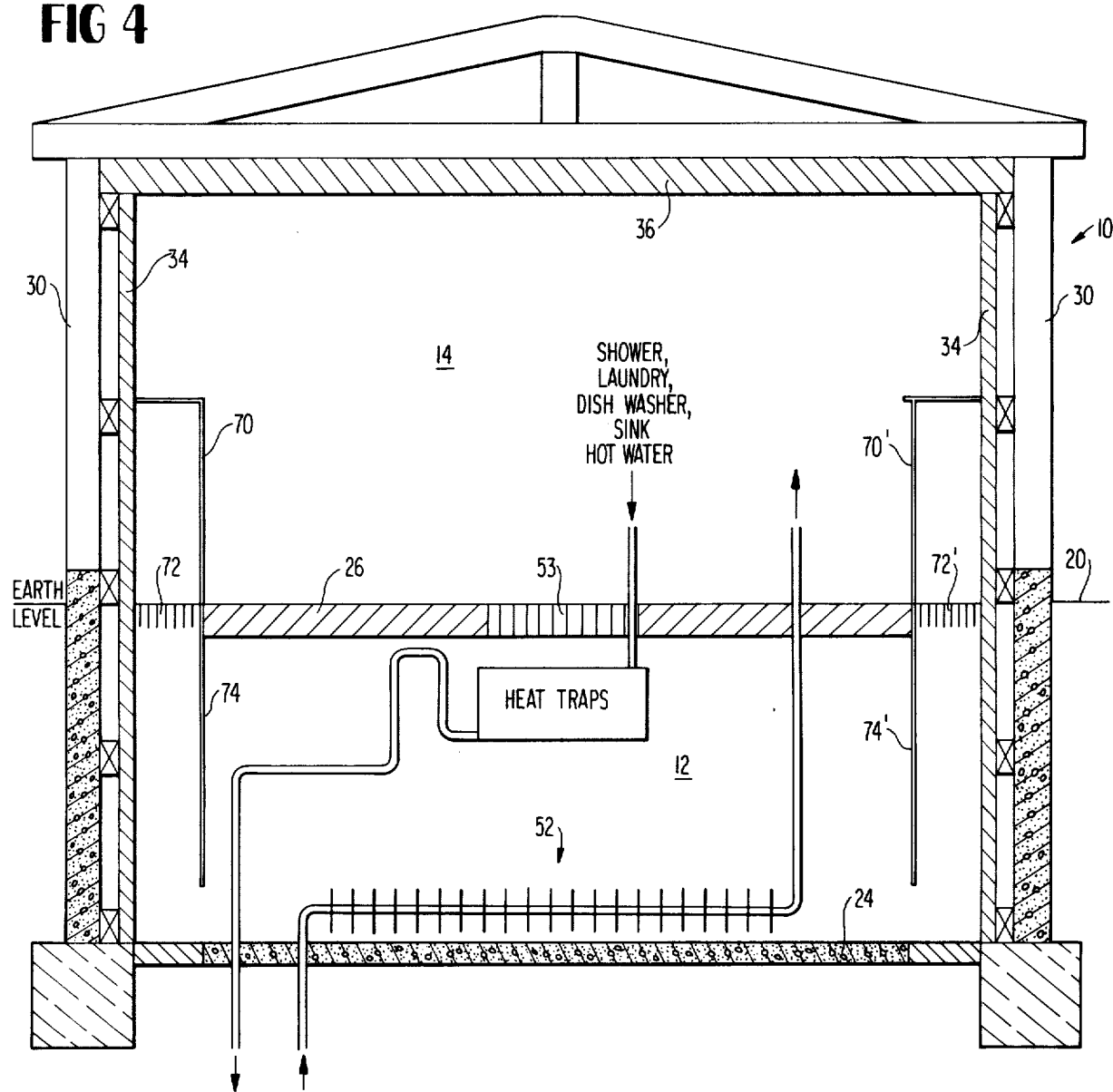
FIG. 4 is a cross-sectional view of a preferred embodiment of the structure of this invention.

With reference to FIG. 4, a preferred embodiment of the structure of this invention 10 also uses vestibules 70 and 70' as follows: in view of the fact that external doors (not shown) to the structure will admit cold air to the structure 10, a preferred embodiment encloses the doorway opening and an entrance portion of the living area 14 in a vestibule 70 or 70'. The floor portion of the vestibule 70 or 70' comprises a grid 72 or 72'. When the door (not shown) has opened, cold air will immediately flow downwardly through the grid 70 or 70' to the basement floor 24.

To facilitate circulation toward the floor 24, a chute 74 or 74' extends downwardly into the basement area 12 substantially therethrough to the floor 24. Cold air then passing through grid 72 or 72' is directed by chute 74 or 74' to the floor 24. At floor 24, the cold air then is warmed by contact therewith for circulation upwardly through the structure 10.

In summer, if a window is left open in an exterior door, and an exhaust fan is located in living area, fresh air will be pulled automatically into vestibule, then down grids to basement floor, to be cooled approximately to 50°, thus providing automatic partial air conditioning.

Figure 5:
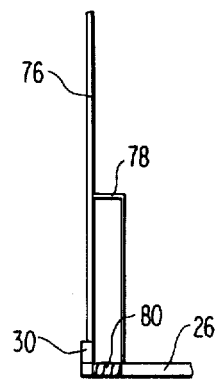
FIG. 5 is a fragmentary cross-sectional view of a picture window embodiment of this invention.

With reference to FIG. 5, the structure 10 of this invention will include windows. A preferred window treatment as shown in FIG. 5, comprises a conventionally mounted preferably thermal-pane or insulated-pane 76 mounted on wall 30 in the conventional fashion. A metal shield 78 is provided substantially covering the lower portion of picture window 76. A grid 80 in floor 26 is located between shield 78 and outer wall 30. Accordingly, interior air cooled by contact with pane 76 will circulate downwardly between shield 78 and pane 76, and through grid 80 to the basement area 12. The portion of shield 78 facing window 76 preferably is painted black or coated with black material whereby it will be warmed by the sun during the daytime. At night, conventional metal venetian blinds or shutters (not shown) may be utilized to cover balance of window 76 and thereby minimize radiant heat loss from within structure 10.

In summary, then, the instant invention comprises a method for constructing structures which have a fully excavated basement. The structure of this invention comprehends an insulated interior design with an uninsulated basement floor and grids located in close proximity to cold air sources and mounted in the earth level floor. The living area above the basement then is in communication with the basement through grids whereby convection currents circulate cold air from above the floor into the basement for heat exchange with the basement for a period. In this way, the interior of the structure may be maintained at the approximate 50° F. temperature of the basement floor. Therefore, only a low capacity auxiliary heating element in the living area will be necessary to raise the temperature to a comfortable level therein.

In contrast to conventional structures, the basement walls are fully insulated so the geothermal heat of the basement floor is conserved.

This invention also includes as alternate embodiments to supplement heat exchange in the basement, one or more water retention heat exchangers or traps whereby waste hot water will be retained in the basement area until it reaches ambient temperature. Furthermore, the heat capacity of the basement floor may be increased by utilizing municipal water in, for example, finned heat exchangers disposed along the floor. The temperature of municipal water is at or near that of the basement floor and therefore heat exchangers of this type would add to the geothermal heat capacity of the basement floor.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraded herein.

What is claimed and desired to be secured by United States Letters Patent is:

1. A method for constructing a geothermal structure having a basement, upstanding walls, and a first floor living area thereover comprising:
    providing said basement with a floor level about seven feet below the surrounding ground level;
    establishing a minimum ambient temperature within said basement which is approximately the temperature of the floor thereof by insulating the walls of said structure including the basement walls and insulating the ceiling over said living area but not to insulate or cover the floor;
    providing air circulating ports through the living area floor extending between the living area and the basement at preselected points adjacent said walls whereby convection currents are established between the living area and the basement so that during winter months air from the living area having a temperature below the ambient basement temperature will circulate to the basement to be warmed thereby establishing a base temperature within said structure equal to the ambient basement temperature, providing a hot water heating means within said structure for furnishing hot wash water; providing waste water collection means within said basement for collecting hot waste wash water; retaining said waste water in said basement until the temperature thereof is equal to the ambient temperature; and subsequently, disposing thereof automatically as hotter water comes in to take the place to the coldest water, and providing hot air grids above the waste water collection means, so as to allow the warmer air to ascend into living quarters; and with vertical panels to keep cold air entering the basement from chilling any warm air at the waste water collection means.

2. The method of claim 1 further comprising providing an auxiliary heating means in said living area for raising the ambient temperature therein to about 68° F.

3. The method of claim 1 wherein said basement walls are windowless.

4. The method of claim 3 wherein the walls of said living area from a plurality of windows and doors and said air circulating ports are disposed through the first floor below said windows and doors.

5. The method of claim 4 wherein insulating the walls of said structure comprises providing an outer wall with mutually spaced horizontally disposed furring strips mounted on the internal surface thereof, and an inner wall mounted on the internal surface of said furring strips, said inner wall including insulation having a thickness of at least about 4 inches, and said inner wall extending from the basement floor to the first floor ceiling.

6. The method of claim 5 further comprising providing insulation in the ceiling over the first floor extending wall-to-wall and having a thickness of about 12 inches.

7. The method of claim 1 further comprising providing a first and a second waste water trap disposed within said basement and spaced away from said grids, conveying hot waste wash water into said first trap, and subsequently from said first trap to said second trap for retention until the temperature thereof is about equal to the ambient basement temperature.

8. The method of claim 1 wherein the step of establishing a minimum ambient basement temperature further comprises providing a source of water at a temperature of about 50° F.; providing a heat exchanger in said basement adjacent the floor thereof; circulating water from said source through said heat exchanger.

9. The method of claim 8 wherein the step of providing a heat exchanger in said basement floor further comprises providing a conduit of heat conducting metal surrounded by a plurality of mutually spaced fins.

10. The method of claim 1 wherein the step of establishing a minimum ambient temperature within said basement further comprises separating the edge of said basement floor adjacent said walls from said walls by providing a strip of insulating material surrounding said floor and disposed between said floor and said adjacent walls of said basement.

* * * * *